(12) United States Patent
Hafiz et al.

(10) Patent No.: US 10,316,415 B2
(45) Date of Patent: Jun. 11, 2019

(54) GREEN HIGH-EFFICIENCY CORROSION INHIBITOR

(71) Applicant: BAKER HUGHES, A GE COMPANY, LLC, Houston, TX (US)

(72) Inventors: Taher Bakr Hafiz, Dhahran (SA); Abdulaziz Abdulrhman Almathami, Al Dammam (SA); Gaurav Agrawal, Aurora, CO (US); Manuel Hoegerl, Al Khobar (SA)

(73) Assignee: Baker Hughes, a GE company, LLC, Houston, TX (US)

( * ) Notice: Subject to any disclaimer, the term of this patent is extended or adjusted under 35 U.S.C. 154(b) by 386 days.

(21) Appl. No.: 15/246,107

(22) Filed: Aug. 24, 2016

(65) Prior Publication Data

US 2018/0057947 A1 Mar. 1, 2018

(51) Int. Cl.
*C23F 11/04* (2006.01)
*C23F 11/173* (2006.01)
*C09K 8/54* (2006.01)

(52) U.S. Cl.
CPC ............... *C23F 11/04* (2013.01); *C09K 8/54* (2013.01); *C23F 11/173* (2013.01); *C09K 2208/32* (2013.01)

(58) Field of Classification Search
CPC ........... C23F 11/04; C23F 11/173; C09K 8/54
See application file for complete search history.

(56) References Cited

U.S. PATENT DOCUMENTS

| 6,706,214 B2 | 3/2004 | Wojcik |
| 2014/0238677 A1* | 8/2014 | Hall .................. C09K 8/42 166/292 |

FOREIGN PATENT DOCUMENTS

WO 0121854 A2 3/2001

OTHER PUBLICATIONS

Alhwaige, Almandi A., et al., "Biobased Chitosan/Polybenzoxazine Cross-Linked Films: Preparation in Aqueous Media and Synergistic Improvements in Thermal and Mechanical Properties," Biomacronmolecules 14, pp. 1806-1815 (2013).

* cited by examiner

*Primary Examiner* — Kevin Joyner
(74) *Attorney, Agent, or Firm* — Mossman, Kumar & Tyler, P.C.

(57) ABSTRACT

A corrosion inhibitor for use in aqueous fluids, e.g. brine, which contact a metal surface, contains a blend or cross-linked reaction product of a main chain type polybenzoxazine (MCTPB) and a chitosan component selected from the group consisting of chitosan, chitosan glycol, and combinations thereof. The MCTPB can be made by reacting formaldehyde, bisphenol A, and tetraethylenepentamine (TEPA). The corrosion inhibitor may contain a small amount of an inorganic acid and/or an organic acid. Suitable organic acids include, but are not necessarily limited to organic acid selected from the group of carboxylic acid consisting of formic acid, acetic acid, propionic acid, butyric acid, valeric acid, caproic acid, citric acid, oxalic acid, malic acid, lactic acid, benzoic acid, or selected from the group of sulfonic acids consisting of p-toluenesulfonic acid, trifluoromethanesulfonic acid, 2-aminoethanesulfonic acid, alkyl-aryl-sulfonic acids such as dodecylbenzenesulfonate, polymeric sulfonic acids, fluorinated derivatives of these organic acids, and combinations thereof.

14 Claims, 1 Drawing Sheet

GREEN HIGH-EFFICIENCY CORROSION INHIBITOR

TECHNICAL FIELD

The present invention relates to methods and compositions for inhibiting and preventing the corrosion of metals in contact with aqueous fluids; and more particularly relates to methods and compositions for inhibiting and preventing the corrosion of metals in contact with brines, which methods include blends with or reaction products of chitosan.

TECHNICAL BACKGROUND

During the production life of an oil or gas well, the production zone within the well is typically subjected to numerous treatments. Corrosion of metallic surfaces, such as downhole tubulars, during such treatments is not uncommon and is evidenced by surface pitting, localized corrosion and loss of metal. Metallic surfaces subject to such corrosion are carbon steels, ferritic alloy steels, and high alloy steels including chrome steels, duplex steels, stainless steels, martensitic alloy steels, austenitic stainless steels, precipitation-hardened stainless steels and high nickel content steels.

Additionally, aqueous fluids, such as those used in drilling and completion, have a high salt content which causes corrosion. Such aqueous fluids containing salts are typically called "brines" and may be intentionally formed or may be naturally formed, such as the brines which are in the form of produced water that is yielded along with the oil and gas. Gases, such as carbon dioxide and hydrogen sulfide, also generate highly acidic environments to which metallic surfaces become exposed. For instance, corrosion effects from brine and hydrogen sulfide are seen in flow lines during the processing of gas streams. The presence of methanol, often added to such streams to prevent the formation of undesirable hydrates, further often increases the corrosion tendencies of metallic surfaces.

Further, naturally occurring and synthetic gases are often conditioned with absorbing acidic gases, carbon dioxide, hydrogen sulfide, and hydrogen cyanide. Degradation of the absorbent and acidic components as well as the generation of by-products (from reaction of the acidic components with the absorbent) results in corrosion of metallic surfaces.

On occasion, a component within a $H_2S$ scavenger may be corrosive. An example of this is glyoxal.

The use of corrosion inhibitors during well treatments to prevent or inhibit the rate of corrosion on metal components and to protect wellbore tubular goods is well known. Commercial corrosion inhibitors are usually mixtures or blends that contain at least one component selected from nitrogenous compounds, such as amines, acetylenic alcohols, organic phosphates, carboxylic acids or reaction products thereof, mutual solvents and/or alcohols, surfactants, oil derivatives, and inorganic and/or organic metal salts.

Many conventional corrosion inhibitors used to reduce the rate of acid attack on metallic surfaces and to protect the tubular goods of the wellbore are becoming unacceptable in oilfield treatment processes. For instance, many conventional corrosion inhibitors have become unacceptable due to environmental protection measures that have been undertaken. Further, in some instances, such as in stimulation processes requiring strong acids, high temperatures, long duration jobs and/or special alloys, the cost of corrosion inhibitors may be so high that it becomes a significant portion of total costs. Thus, there is a need for corrosion inhibitors to be as efficient as possible.

It would be desirable to find alternative corrosion inhibitors which are cost effective and which are capable of controlling, reducing or inhibiting corrosion. It would also be desirable if such corrosion inhibitors were "green" that is, were environmentally friendly, and had little or no environmental concerns, or which had reduced environmental concerns as compared with current commercially available corrosion inhibitors.

SUMMARY

There is provided in one non-restrictive version, a method for inhibiting or preventing the corrosion of a metal surface in contact with an aqueous fluid, where the method includes introducing an effective amount of a corrosion inhibitor into the aqueous fluid in contact with the metal surface to inhibit or prevent corrosion of the metal surface. The corrosion inhibitor includes, but is not necessarily limited to, a blend of main chain type polybenzoxazine (MCTPB) and a chitosan component selected from the group consisting of chitosan, chitosan glycol, and combinations thereof and/or a cross-linked reaction product of chitosan and MCTPB.

There is additionally provided in another non-limiting embodiment a corrosion inhibitor composition for inhibiting or preventing the corrosion of a metal surface in contact with an aqueous fluid, where the corrosion inhibitor composition includes, but is not necessarily limited to, a blend of main chain type polybenzoxazine (MCTPB) and a chitosan component selected from the group consisting of chitosan, chitosan glycol, and combinations thereof and/or a cross-linked reaction product of chitosan and MCTPB.

DETAILED DESCRIPTION

Figure 1:
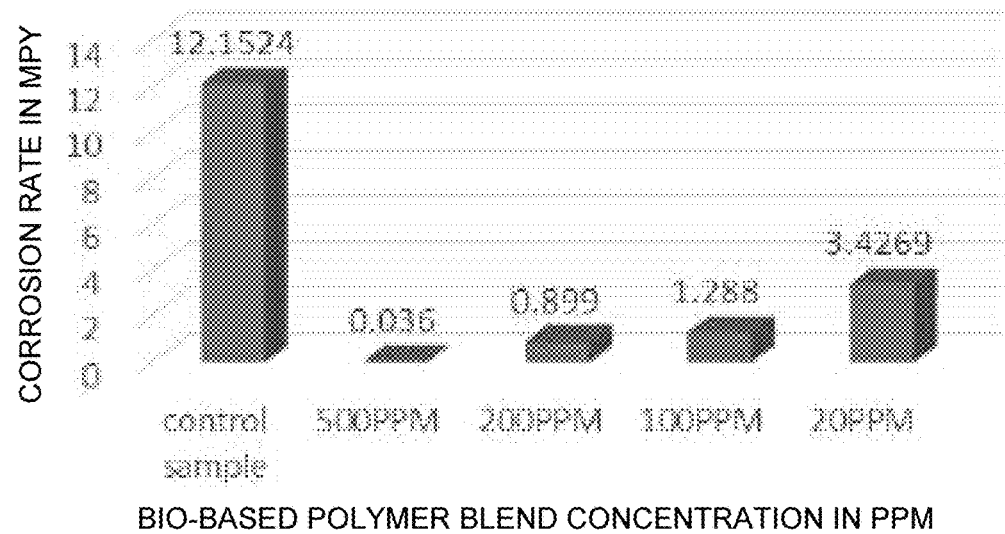
FIG. 1 is a graph of the corrosion inhibition effect of chitosan/MCTPB blend plotted as corrosion rate in mpy as a function of the amount of chitosan/MCTPB blend introduced into the brine.

It has been discovered that a bio-based polymer blend or reaction product of chitosan (CHI) and Main Chain Type polybenzoxazine (MCTPB) is a green corrosion inhibitor in the application of preventing or inhibiting the corrosion of steel/metallic based substrates in the presence of aqueous fluids, including, but not necessarily limited to, brine, and more particularly oilfield and refinery aqueous fluids. The blend is safe and easy to prepare with no strong acid being required and without the addition of other additives or catalysts. Neither toxic materials nor undesirable byproducts are generated during the polymerization and blending of the corrosion inhibitor described herein. A new, bio-based, green corrosion inhibitor will be described that in preliminary laboratory testing has shown the potential to reduce carbon steel corrosion by over 99% when used at the concentration level of 500 ppm. This new chemistry is based on bio-based polymer blends or reaction products of chitosan and Main Chain Type polybenzoxazine (MCTPB). The raw materials to make MCTPB are commercially available. In one non-limiting embodiment the described chemistry could also be used as a coating. Corrosion mitigation is a multi-billion industry, within which green chemistries are gaining a foothold commercially.

The application of the polymer blend as corrosion inhibitor was studied and evaluated according to NACE standard MT0284 (solution A) that represents a wide range of oilfield brine corrosive environments. The CHI/MCTPB blend showed an excellent performance and was found to be an excellent corrosion inhibitor as compared with chitosan used alone.

As previously discussed, in the petroleum, petrochemical, and oil gas industries a major cause of carbon steel well/piping system failure is corrosion, especially, when metal pipes and other equipment is used in low pH (acidic) brine environments. The use and development of a green natural polymer blend or reaction product for coating or other applications has been discovered as described herein. The polymer blend or reaction products described herein can be easily injected in the process to inhibit or reduce the corrosion rate.

As discussed, the biological-based (bio-based) polymer blend or reaction product (CHI/MCTPB) has been discovered to be a useful corrosion inhibitor. Also the blends and/or reaction products discussed herein can be further developed for coating applications. By "main chain" type polybenzoxazine is meant that the benzoxazine functionality is part of the polymer backbone, in contrast to the benzoxazine functionality being in a pendent side chain. The main chain type or side-chain type polybenzoxazines are known to have good ductility.

Without being limited to any particular theory, it is believed that the presence of an amine group (—NH$_2$) in the structure of chitosan and both benzoxazine and amine groups in MCTPB would contribute to corrosion protection in case of steel based substrates. In the process of synthesizing and purifying benzoxazine there are no, or only limited environmental concerns. Benzoxazine polymers are already used in the electronic industry and aerospace industry in many countries.

Polymer Blend and Treatment Preparation

The structures of chitosan and Main Chain-Type Poly Benzoxazine (CHI & MCTPB) are shown below:

-continued

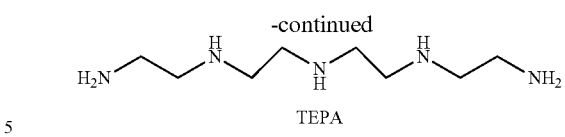

TEPA

A CHI/MCTPB was prepared and synthesized according to the procedure reported by Almandi A. Alhwaige; Tarek Agag; Ishida, H.; Syed Qutubuddin, dx.doi.org/10.102/bm4002014|Biomacromolecules 2013, 14, 1806-1815, incorporated herein by reference in its entirety, by mixing (CHI/MCTPB) in aqueous acetic acid solution (1%).

It is expected that while formaldehyde may be the necessary aldehyde in the synthesis, that other bis-phenol compounds and derivatives could be used in place of the Bisphenol A. Other primary amines besides TEPA may also be used as long as there are present two primary amine functionalities. However, it is possible that aldehydes other than formaldehyde may work.

It is expected that chitosan glycol may work together with or in place of chitosan. Chitosan glycol is generally more water soluble than chitosan which may enhance the inhibitor properties and efficiency of the resulting blend.

First, in one non-limiting embodiment, MCTPB was prepared as follows:
  Place 12.06 g, 52.82 mmol of Bisphenol A in an ice bath temperature range from 0-5° C., mix the solution with 50 mL 1,4-dioxane.
  Add 10 g, 52.82 mmol of TEPA into the mixture.
  Gradually add 17.15 g, 211.3 mmol of formaldehyde under stirring until a homogeneous phase of the liquid mixture is reached.

Second, the following procedure was used for prepare the chitosan and MCTPB blends:
  Blends of CHI and MCTPB (Bisphenol A-TEPA) in ratios of 2:1 with suitable amounts of CHI and MCTPB were mixed in 30 mL of 1 wt % acetic acid solution.

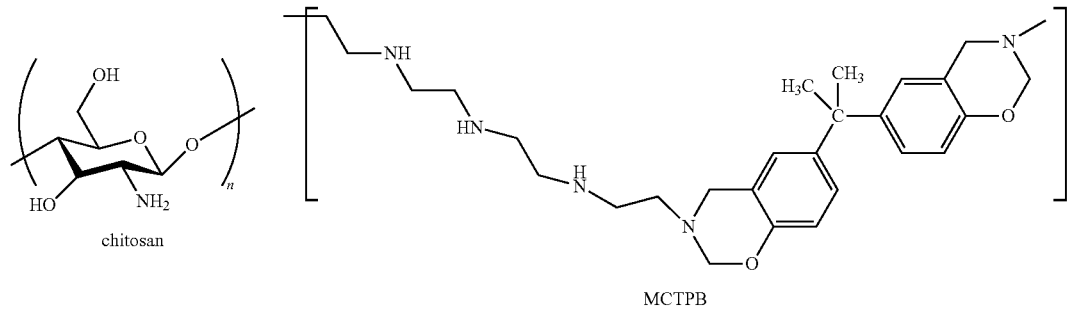

The benzoxazine polymer is synthesized by the reaction of bisphenol A with formaldehyde and a primary amine such as tetraethylenepentamine (TEPFA), whose structures are shown below, followed by an ice bath. The mole ratio of formaldehyde to bisphenol A to TEPA is about 4:1:1. The benzoxazine monomer is polymerized to give MCTPB.

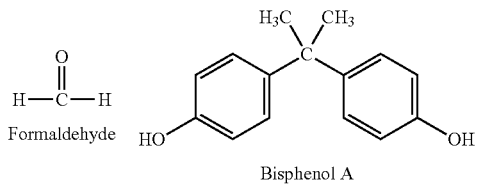

CHI was dissolved in 1 wt % acetic acid solution under continuous magnetic stirring at temperature from 15 to 30° C.

Separately MCTPB (Bisphenol A-TEPA) was dissolved in 1 wt % aqueous acetic acid.

Gradually or drop wise, the solution of CHI was added to MCTPD solution under vigorous stirring until the mixture became homogeneous.

In one non-limiting embodiment the weight ratio of chitosan to MCTPB from about 1.5 to 2.5 independently to about 0.5 to 1.5; alternatively about 2 to 1 independently to about 5 to 1; in another non-restrictive embodiment the weight ratio is about 0.5 to 3.5. The term "independently" as used herein with respect to a range means that any lower threshold may be combined with any upper threshold to give a suitable alternative range.

In another non-limiting embodiment, at least one inorganic or organic acid is present to help dissolve the chitosan. The corrosion inhibitor may comprise or contain from about 0.01 wt % independently to about 1 wt %, alternatively from about 0.05 wt % independently to about 0.5 wt %, based on the total corrosion inhibitor, of an organic acid and/or an inorganic acid. Suitable inorganic acids to lower the pH to help solubilize the chitosan include, but are not necessarily limited to, hydrochloric acid, sulfuric acid, phosphoric acid, and combinations thereof. Suitable organic acids are selected from the group of carboxylic acid consisting of formic acid, acetic acid, propionic acid, butyric acid, valeric acid, caproic acid, citric acid, oxalic acid, malic acid, lactic acid, benzoic acid, or selected from the group of sulfonic acids consisting of p-toluenesulfonic acid, trifluoromethanesulfonic acid, 2-aminoethanesulfonic acid, alkyl-aryl-sulfonic acids such as dodecylbenzenesulfonate, polymeric sulfonic acids, and combinations thereof. Fluorinated derivatives of these organic acids would also be acceptable. It would be additionally suitable to use a buffered system to create a lower pH value to solubilize the chitosan, which buffered system would use the above-noted acids and suitable bases, and the corresponding base salts.

Corrosion Study

FIG. 1 presents the corrosion rate in mpy (mils per year) of the bio-based polymer blend chitosan/main chain type polybenzoxazine inhibitor at different concentrations for the protection of carbon steel test specimens. The brine used was 5% NaCl+0.5% acetic acid ($CH_3COOH$). The test period was 336 hours. It may be seen that the corrosion rate decreased significantly with increasing the corrosion inhibitor concentration as compared to the test specimen without corrosion inhibitor (control).

Figure 2:
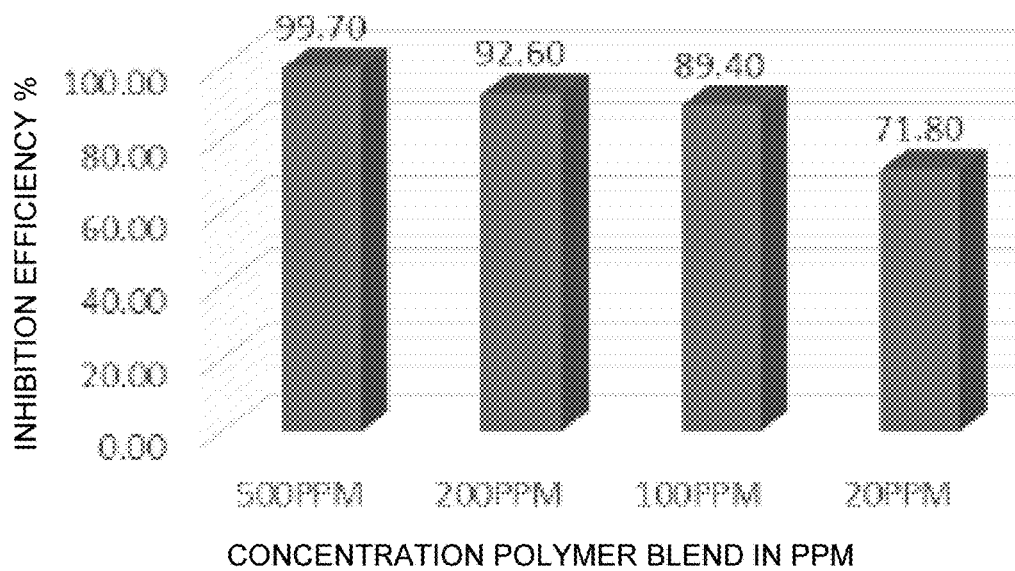
FIG. 2 is a graph of the corrosion efficiency of the chitosan/MCTPB blend plotted as corrosion efficiency in % as a function of the amount of chitosan/MCTPB blend introduced into the brine.

The corrosion inhibitor polymer blend showed excellent corrosion efficiency as presented in FIG. 2. The bio-based polymer blend corrosion efficiency is 71.8%, 89.4%, 92.6% and 99.7% at concentrations of 20 ppm, 100 ppm, 200 ppm and 500 ppm, respectively.

It is not entirely clear if the corrosion inhibitor is a blend or a reaction product of chitosan and MCTPB. Without being restricted to a particular theory, it is believed that the initial mixture of CHI and MCTPB at room temperature is a polymer blend. The two polymers are believed to coordinate or orient to each other via reversible hydrogen bonding. Depending on further temperature treatment, the two polymers may undergo covalent crosslinking at temperatures of 60-80° C. or above. There may or may not be some degree of crosslinking already happening at lower temperatures.

In another non-limiting embodiment about how the corrosion inhibition functions, the polymer blend or reaction product does not form a coating. It is believed that both polymers bear functional groups suitable to adsorb onto the metal surface and coordinate to each other. In other words, the polymers form an adsorption film on top of the metal. However, there is the possibility that the polymer mixture forms covalent bonds between the two polymer types and thus forms a polymer coating. The interaction of the polymer with the metal surface and competing influences from salts and organic phase needs more investigation to study physical and/or chemical adsorption.

In the foregoing specification, the invention has been described with reference to specific embodiments thereof, and has been described as effective for inhibiting corrosion of a metal surface in contact with an aqueous fluid, in particular brine. However, it will be evident that various modifications and changes can be made thereto without departing from the broader scope of the invention as set forth in the appended claims. Accordingly, the specification is to be regarded in an illustrative rather than a restrictive sense. For example, specific combinations of aqueous fluids, chitosan components, polybenzoxazines, primary amines, aldehydes, organic acids, proportions, and other components falling within the claimed elements and parameters, but not specifically identified or tried in a particular method or composition, are anticipated to be within the scope of this invention. For instance, the methods and compositions described herein are also applicable to aqueous fluids other than brines including, but are not necessarily limited to, aqueous fluids used to recover oil and/or gas from a subterranean formation, aqueous fluids produced from an oil or gas well, aqueous fluids used in the processing of oil or gas, and the like. In particular, the corrosion inhibitors described herein may be used in drilling fluids and completion fluids. Similarly, it is expected that the methods described herein may be successfully practiced using different loadings, compositions, manufacturing processes, equipment, temperature ranges, and proportions than those described or exemplified herein.

The words "comprising" and "comprises" as used throughout the claims is interpreted to mean "including but not limited to".

The present invention may also suitably consist of or consist essentially of the elements disclosed. Alternatively, the compositions and methods may be practiced in the absence of an element not disclosed. For instance, there may be provided a method for inhibiting or preventing the corrosion of a metal surface in contact with an aqueous fluid, where the method consists essentially of or consists of introducing an effective amount of a corrosion inhibitor into the aqueous fluid in contact with the metal surface to inhibit or prevent corrosion of the metal surface, where the corrosion inhibitor is selected from the group consisting of: a blend of main chain type polybenzoxazine (MCTPB) and a chitosan component selected from the group consisting of chitosan, chitosan glycol, and combinations thereof; a cross-linked reaction product of chitosan and MCTPB; and combinations thereof.

In another non-limiting embodiment, there may be provided corrosion inhibitor for inhibiting or preventing the corrosion of a metal surface in contact with an aqueous fluid, the corrosion inhibitor consisting essentially of or consisting of a blend of main chain type polybenzoxazine (MCTPB) and a chitosan component selected from the group consisting of chitosan, chitosan glycol, and combinations thereof; a cross-linked reaction product of chitosan and MCTPB; and combinations thereof.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for inhibiting or preventing the corrosion of a metal surface in contact with an aqueous fluid, the method comprising:
   introducing an effective amount of a corrosion inhibitor into the aqueous fluid in contact with the metal surface to inhibit or prevent corrosion of the metal surface, where the corrosion inhibitor is selected from the group consisting of:
      a blend of a main chain type polybenzoxazine (MCTPB) and a chitosan component selected from the group consisting of chitosan, chitosan glycol, and combinations thereof;
      a cross-linked reaction product of chitosan and MCTPB; and
      combinations thereof.

2. The method of claim 1 where the aqueous fluid is brine.

3. The method of claim 1 where the weight ratio of chitosan to MCTPB ranges from about 5 to 1 to about 0.5 to 3.5.

4. The method of claim 1 where the weight ratio of chitosan to MCTPB is about 1 to 3.5.

5. The method of claim 1 where the effective amount of corrosion inhibitor in the aqueous fluid ranges from about 1 to about 500 ppm.

6. The method of claim 1 where the corrosion inhibitor contains from about 0.01 wt % to about 1 wt %, based on the total corrosion inhibitor, of an acid selected from the group consisting of:
   an organic acid selected from the group of carboxylic acid consisting of formic acid, acetic acid, propionic acid, butyric acid, valeric acid, caproic acid, citric acid, oxalic acid, malic acid, lactic acid, benzoic acid, or selected from the group of sulfonic acids consisting of p-toluenesulfonic acid, trifluoromethanesulfonic acid, 2-aminoethanesulfonic acid, alkyl-aryl-sulfonic acids such as dodecylbenzenesulfonate, polymeric sulfonic acids, fluorinated derivatives of these organic acids, and combinations thereof;
   an inorganic acid selected from the group consisting of hydrochloric acid, sulfuric acid, phosphoric acid, and combinations thereof; and
   combinations thereof.

7. The method of claim 1 where the MCTPB is made by reacting formaldehyde, bisphenol A, and tetraethylenepentamine (TEPA).

8. The method of claim 7 where the mole ratio of formaldehyde to bisphenol A to TEPA is about 4:1:1.

9. The method of claim 1 where the aqueous fluid is selected from the group consisting of aqueous fluids used to recover oil and/or gas from a subterranean formation, aqueous fluids produced from an oil or gas well, aqueous fluids used in the processing of oil and/or gas, and combinations thereof.

10. A method for inhibiting or preventing the corrosion of a metal surface in contact with brine, the method comprising:
    introducing from about 1 to about 500 ppm of a corrosion inhibitor into the brine in contact with the metal surface to inhibit or prevent corrosion of the metal surface, where the corrosion inhibitor is selected from the group consisting of:
       a blend of main chain type polybenzoxazine (MCTPB) and a chitosan component selected from the group consisting of chitosan, chitosan glycol, and combinations thereof;
       a cross-linked reaction product of chitosan and MCTPB; and
       combinations thereof;
    where the weight ratio of chitosan to MCTPB ranges from about 5 to 1 to about 0.5 to 3.5.

11. The method of claim 10 where the corrosion inhibitor contains from about 0.01 wt % to about 1 wt %, based on the total corrosion inhibitor, of an acid selected from the group consisting of
    an organic acid selected from the group of carboxylic acid consisting of formic acid, acetic acid, propionic acid, butyric acid, valeric acid, caproic acid, citric acid, oxalic acid, malic acid, lactic acid, benzoic acid, or selected from the group of sulfonic acids consisting of p-toluenesulfonic acid, trifluoromethanesulfonic acid, 2-aminoethanesulfonic acid, alkyl-aryl-sulfonic acids such as dodecylbenzenesulfonate, polymeric sulfonic acids, fluorinated derivatives of these organic acids, and combinations thereof;
    an inorganic acid selected from the group consisting of hydrochloric acid, sulfuric acid, phosphoric acid, and combinations thereof; and
    combinations thereof.

12. The method of claim 10 where the MCTPB is made by reacting formaldehyde, bisphenol A, and tetraethylenepentamine (TEPA).

13. The method of claim 12 where the mole ratio of formaldehyde to bisphenol A to TEPA is about 4:1:1.

14. The method of claim 10 where the aqueous fluid is selected from the group consisting of aqueous fluids used to recover oil and/or gas from a subterranean formation, aqueous fluids produced from an oil or gas well, aqueous fluids used in the processing of oil and/or gas, and combinations thereof.

* * * * *